US012475835B2

(12) United States Patent
Kim et al.

(10) Patent No.: US 12,475,835 B2
(45) Date of Patent: Nov. 18, 2025

(54) CONTROL DEVICE FOR DRIVING DISPLAY PANEL, DISPLAY DEVICE INCLUDING THE CONTROL DEVICE, AND METHOD OF OPERATING THE CONTROL DEVICE

(71) Applicant: Samsung Display Co., Ltd., Yongin-Si (KR)

(72) Inventors: Jong Man Kim, Yongin-si (KR); Byoung Kwan An, Yongin-si (KR); Sang Myeon Han, Yongin-si (KR); Seung Ho Park, Yongin-si (KR); Nam Jae Lim, Yongin-si (KR); Joon Hyeok Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/197,722

(22) Filed: May 16, 2023

(65) Prior Publication Data

US 2024/0153441 A1 May 9, 2024

(30) Foreign Application Priority Data

Nov. 4, 2022 (KR) ........................ 10-2022-0146187

(51) Int. Cl.
*G09G 3/32* (2016.01)
*G09G 3/20* (2006.01)

(52) U.S. Cl.
CPC ............ *G09G 3/32* (2013.01); *G09G 3/2007* (2013.01); *G09G 2310/08* (2013.01); *G09G 2320/0233* (2013.01); *G09G 2320/0257* (2013.01); *G09G 2320/043* (2013.01); *G09G 2360/12* (2013.01)

(58) Field of Classification Search
CPC .... G09G 3/32; G09G 3/2007; G09G 2310/08; G09G 2320/0233; G09G 2320/0257; G09G 2320/043; G09G 2360/12; G09G 3/3208; G09G 3/3266; G09G 3/3275; G09G 3/2092; G09G 2320/0285; G09G 2320/046; G09G 2360/16; G09G 5/001
See application file for complete search history.

(56) References Cited

U.S. PATENT DOCUMENTS

| | | | |
|---|---|---|---|
| 9,125,278 | B2 | 9/2015 | Nathan et al. |
| 9,947,265 | B2 | 4/2018 | Park et al. |
| 10,262,582 | B2 | 4/2019 | Han |
| 11,062,660 | B1 | 7/2021 | Sohn et al. |
| 11,238,787 | B2 | 2/2022 | An |

(Continued)

FOREIGN PATENT DOCUMENTS

| | | | | |
|---|---|---|---|---|
| JP | 2006003893 A | * | 1/2006 | G09G 3/3648 |
| JP | 2013125973 A | * | 6/2013 | H04N 19/105 |

(Continued)

*Primary Examiner* — Stephen G Sherman
(74) *Attorney, Agent, or Firm* — Innovation Counsel LLP

(57) ABSTRACT

Provided is a control device connected to a display panel including a controller configured to display images by driving the display panel according to data corresponding to image frames, and a memory connected to the controller. The controller is configured to select at least one of the image frames as a reference image frame, and update stress data corresponding to a partial area of the display panel in the memory based on one image data block selected from image data blocks of the reference image frame.

17 Claims, 10 Drawing Sheets

(56) References Cited

U.S. PATENT DOCUMENTS

| | | | | |
|---|---|---|---|---|
| 2004/0263741 | A1* | 12/2004 | Koyama | G09G 3/3233 349/139 |
| 2016/0140895 | A1* | 5/2016 | Park | G09G 3/3208 345/690 |
| 2017/0092190 | A1* | 3/2017 | Choe | G09G 3/2003 |
| 2021/0029272 | A1* | 1/2021 | Tao | G09G 3/3208 |

FOREIGN PATENT DOCUMENTS

| | | | |
|---|---|---|---|
| KR | 10-2019-0088150 | A | 7/2019 |
| KR | 10-2097633 | B1 | 4/2020 |
| KR | 10-2021-0091859 | A | 7/2021 |
| KR | 10-2313733 | B1 | 10/2021 |

* cited by examiner

CONTROL DEVICE FOR DRIVING DISPLAY PANEL, DISPLAY DEVICE INCLUDING THE CONTROL DEVICE, AND METHOD OF OPERATING THE CONTROL DEVICE

This application claims priority to Korean Patent Application No. 10-2022-0146187, filed on Nov. 4, 2022, and all the benefits accruing therefrom under 35 U.S.C. § 119, the content of which in its entirety is herein incorporated by reference.

BACKGROUND

1. Field

The present disclosure generally relates to an electronic device, and more particularly, to a control device for driving a display panel, a display device including the control device, and a method of operating the control device.

2. Description of the Related Art

A display device may consume relatively low power and may be driven in a relatively fast response speed, using a light emitting diode (LED) or an organic light emitting diode (OLED) that generates light by recombination of an electron and a hole.

A light emission luminance of the display device is determined according to a driving current flowing through a light emitting diode of each pixel. In a case of a high luminance image, a larger driving current is required than that of a low luminance image. Each pixel may be stressed according to the drive current, and the stress may deteriorate the pixel. A more stressed pixel may be more deteriorated, and the deteriorated pixel may emit light of a reduced luminance in response to data of the same grayscale. This may reduce display quality.

Image sticking may be removed by accumulating stress (or a deterioration degree) corresponding to the pixel and performing compensation for a data voltage applied to the pixel based on the accumulated data using an image sticking compensation technology.

The above-described content is only intended to help understanding of the background of the technical ideas of the disclosure, and thus it cannot be understood as the prior art known to those skilled in the art.

SUMMARY

The applicant has recognized that processes associated with data indicating a stress on a pixel may consume many resources. For example, pixels may be divided into a plurality of pixel groups, and a stress corresponding to each pixel group may be accumulated as data. In this case, as resolution of stress data increases, that is, as the number of pixels of each group decreases, a size of total stress data (for example, the number of data bits) increases. This may cause many resources to be consumed in the processes associated with the stress data.

Embodiments of the disclosure are to provide a control device capable of reducing resources required in compensating for image data by estimating a stress applied to a display panel, a display device including the control device, and a method of operating the control device. For example, the control device requires a relatively reduced a calculation amount in estimating the stress applied to the display panel, and such calculation requires a working memory having a relatively reduced input/output bandwidth.

According to an embodiment of the disclosure, a control device connected to a display panel includes a controller configured to display images by driving the display panel according to data corresponding to image frames, and a memory connected to the controller. The controller is configured to select at least one of the image frames as a reference image frame, and update stress data corresponding to a partial area of the display panel in the memory based on one image data block selected from among image data blocks of the reference image frame.

The controller may be configured to, in association with the reference image frame, update the stress data corresponding to the partial area of the display panel without updating stress data corresponding to a remaining area of the display panel.

The display panel may include display areas for respectively displaying the image data blocks of the reference image frame, and the partial area of the display panel may be any one of the display areas.

When a first image frame among the image frames is selected as the reference image frame, the updated stress data may correspond to a first display area among the display areas, and when a second image frame among the image frames is selected as the reference image frame, the updated stress data may correspond to a second display area different from the first display area among the display areas.

The controller may be configured to update the stress data corresponding to different display areas whenever each of the image frames is selected as the reference image frame.

The controller may be configured to correct at least a portion of the additional image frame based on the stress data, and display the corrected image frame on the display panel, when an additional image frame is received.

According to another embodiment of the disclosure, a display device includes a display panel, a controller configured to display images by driving the display panel according to data corresponding to a plurality of image frames, and a memory connected to the controller. The plurality of image frames are divided into frame groups, and the controller is configured to select any one of the frame groups, select at least one of the image frames included in the selected frame group as a reference image frame, and update a stress data set corresponding to a partial area of the display panel in the memory based on one image data block selected from among image data blocks of the reference image frame.

The controller is configured to, in association with the reference image frame, update the stress data set corresponding to the partial area of the display panel without updating a stress data set corresponding to a remaining area of the display panel.

The display panel may include display areas for respectively displaying the image data blocks of the reference image frame, and the partial area of the display panel is any one of the display areas.

The display areas may include first to m-th display areas (m is a natural number), and the controller is configured to update first to m-th stress data sets respectively corresponding to the first to m-th display areas in the memory based on the image frames included in the selected frame group.

The image frames included in the selected frame group may include first to m-th image frames, and the respective first to m-th stress data sets may be updated based on different image frames among the first to m-th image frames.

Each of the frame groups may include first to m-th image frames, and the controller may be configured to update the first to m-th stress data sets of the memory based on the first to m-th image frames of a first frame group among the frame groups, and further update the first to m-th stress data sets of the memory based on the first to m-th image frames of a second frame group among the frame groups.

The controller may be configured to determine first to m-th compensation data blocks corresponding to the first to m-th display areas based on the first to m-th stress data sets.

The controller may be configured to correct an additional image frame according to the first to m-th compensation data blocks and display the corrected image frame on the display panel, when an additional image frame is received.

The memory may include a first memory area and a second memory area separated from each other, the first to m-th stress data sets may be stored in the first memory space, and the first to m-th compensation data blocks may be stored in the second memory space.

The controller and the memory may be mounted on one control board.

According to still another embodiment of the disclosure, a method of operating a control device for driving a display panel includes receiving a plurality of image frames divided into frame groups, selecting at least one of the image frames included in one selected from the frame groups as a reference image frame, and updating a stress data set corresponding to a partial area of the display panel in a memory based on one image data block selected from among image data blocks of the reference image frame.

The stress data set corresponding to the partial area of the display panel may be updated without updating a stress data set corresponding to a remaining area of the display panel, in association with the reference image frame.

The display panel may include display areas for respectively displaying the image data blocks of the reference image frame, and the stress data corresponding to different display areas among the display areas may be updated whenever each of the image frames is selected as the reference image frame.

According to still another embodiment of the disclosure, a display device includes a display panel, a controller configured to display images by driving the display panel according to data corresponding to image frames, and a memory connected to the controller. The controller is configured to select at least one of the image frames as a reference image frame and update stress data corresponding to a partial area of the display panel in the memory based on one image data block selected from among image data blocks of the reference image frame.

According to embodiments of the disclosure, a control device capable of reducing resources required in compensating for image data by estimating a stress applied to a display panel, a display device including the control device, and a method of operating the control device are provided.

An effect according to embodiments is not limited by the content exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
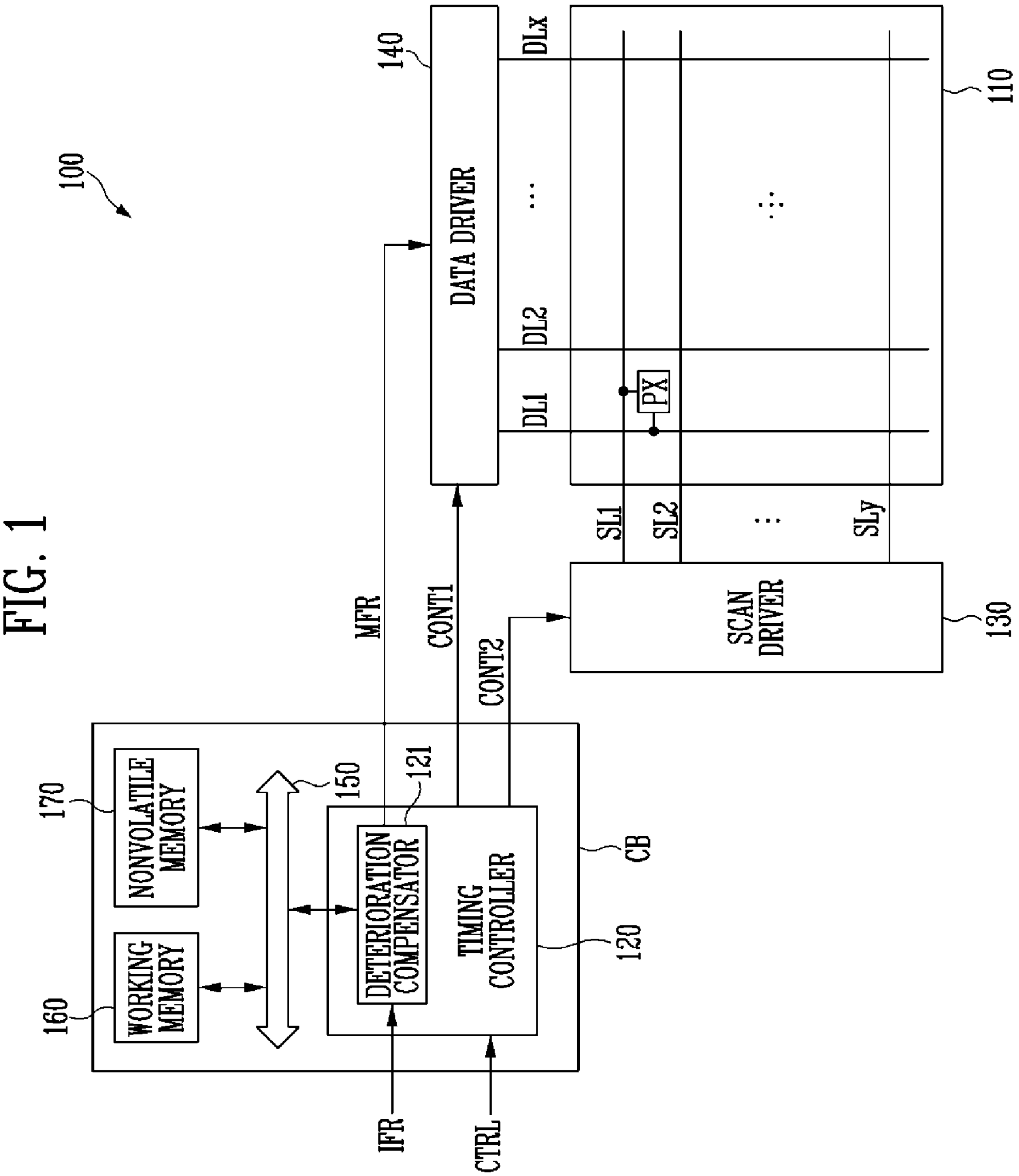
FIG. 1 is a block diagram illustrating a display device according to an embodiment of the disclosure.

The disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

It should be understood that in the present application, a term of "include", "have", or the like is used to specify that there is a feature, a number, a step, an operation, a component, a part, or a combination thereof described in the specification, but does not exclude a possibility of the presence or addition of one or more other features, numbers, steps, operations; components, parts, or combinations thereof in advance.

The advantages and features of the disclosure and a method of achieving them will become apparent with reference to the embodiments described in detail later together with the accompanying drawings. However, the disclosure is not limited to the embodiments disclosed below, and may be implemented in various different forms. In the following description, a case where a portion is connected to another portion includes a case where they are electrically connected to each other with another element interposed therebetween as well as a case in which they are directly connected to each other. In an embodiment of the disclosure, a term "connection" between two configurations may mean that both of an electrical connection and a physical connection are inclusively used.

Figure 2:
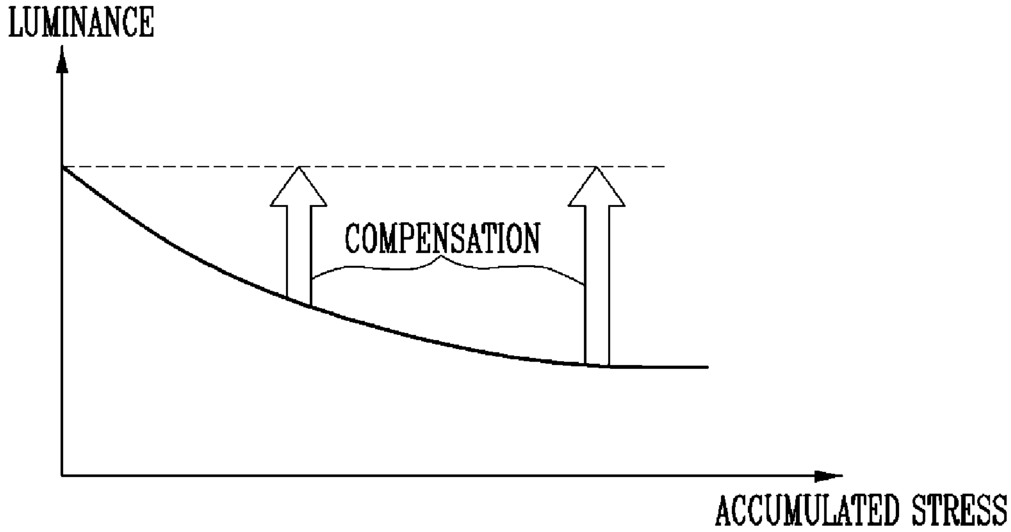
FIG. 2 is a graph illustrating a change of a luminance of a display panel according to an accumulated stress applied to a display panel of FIG. 1.

FIG. 1 is a block diagram illustrating a display device according to an embodiment of the disclosure. FIG. 2 is a graph illustrating a change of a luminance of a display panel according to an accumulated stress applied to the display panel of FIG. 1.

Referring to FIG. 1, the display device 100 includes the display panel 110, a timing controller 120, a scan driver 130, and a data driver 140.

The display panel 110 includes pixels PX. The pixels PX are connected to the scan driver 130 through first to y-th scan lines SL1 to SLy, and are connected to the data driver 140 through first to x-th data lines DL1 to DLx.

Each of the pixels PX may include a light emitting element and transistors for driving the light emitting element. In embodiments, the light emitting element may include an organic light emitting diode and/or an inorganic light emitting diode.

The timing controller 120 controls an overall operation of the display device 100. The timing controller 120 receives an input image frame IFR and control signals CTRL for controlling display of the input image frame IFR, for example, a vertical synchronization signal, a horizontal synchronization signal, a main clock signal, a data enable signal, and the like.

According to an embodiment of the disclosure, the timing controller 120 may include a deterioration compensator 121 configured to estimate a stress applied to the pixels PX according to an operation of the display panel 110, and generate a corrected image frame MFR by performing compensation for the input image frame IFR according to the estimated data.

The timing controller 120 may transform a data format and/or arrangement of the corrected image frame MFR to be suitable for the display panel 110 based on the control signals CTRL, and may perform various processes on the corrected image frame MFR such as adjusting a timing of the corrected image frame MFR, or the like. The corrected image frame MFR is provided to the data driver 140.

The timing controller 120 may transmit a first control signal CONT1 to the data driver 140 and a second control signal CONT2 to the scan driver 130 based on the control signals CTRL. In embodiments, the first control signal CONT1 may include a clock signal and a line latch signal, and the second control signal CONT2 may include a vertical synchronization start signal, an output enable signal, and the like.

The scan driver 130 drives each of the first to y-th scan lines SL1 to SLy in response to the second control signal CONT2 from the timing controller 120. In embodiments, the scan driver 130 includes a scan driving integrated circuit (IC). In embodiments, the scan driver 130 may be implemented as a circuit using an amorphous silicon gate (ASG) using an amorphous silicon thin film transistor (a-Si TFT), an oxide semiconductor, a crystalline semiconductor, a polycrystalline semiconductor, or the like. The scan driver 130 may be formed simultaneously with the pixels PX.

The data driver 140 may drive the first to x-th data lines DL1 to DLx in response to the first control signal CONT1. The data driver 140 may output grayscale voltages corresponding to the corrected image frame MFR to the first to x-th data lines DL1 to DLx in response to the first control signal CONT1.

When each of the scan lines SL1 to SLy is driven with a gate-on voltage by the scan driver 140, the grayscale voltages corresponding to the corrected image frame MFR may be applied to the data lines DL1 to DLx by the data driver 140. Accordingly, the grayscale voltages corresponding to the corrected image frame MFR may be provided to the pixels PX of a corresponding scan line, and thus the pixels PX may output light of a luminance corresponding to the grayscale voltages.

As described above, the timing controller 120 may display an image by driving the display panel 110 through the scan driver 130 and the data driver 140.

Referring to FIG. 2, a horizontal axis represents the accumulated stress applied to the pixels of the display panel 110 of FIG. 1, and a vertical axis represents a luminance generated by a corresponding pixel in response to an image frame (for example, MFR of FIG. 1) of the same grayscale value. In FIG. 2, as the stress applied to the pixel accumulates, a luminance drop for the same grayscale value intensified. For example, as the accumulated stress increases, the corresponding pixel may be gradually deteriorated, and as the pixel is deteriorated, the corresponding pixel may output reduced luminance in response to the same grayscale value.

In consideration of such a luminance drop, compensation may be performed for the grayscale value of the image frame with reference to the accumulated stress, and thus a luminance of a desired level may be output through the pixel. For example, as the accumulated stress increases, a compensation grayscale added to a grayscale value of the image frame may increase as indicated by arrows of FIG. 2, and thus the pixel may output a luminance of a desired level as indicated by a dotted line of FIG. 2.

Accumulated stress may be related to grayscale values displayed by the pixel. For example, the grayscale value of each image frame displayed by each pixel may be continuously monitored to accumulate the grayscale values displayed by the pixel, and the accumulated stress may be estimated based on the accumulated data.

The accumulated data may be loaded into a working memory such as a RAM and continuously updated in association with the image frame, and may be periodically stored (or backed up) in a nonvolatile storage medium such as a flash memory. When the accumulated data is continuously updated in association with each image frame, resources required for processes associated with the accumulated data may be relatively large due to a relatively large size (that is, the number of data bits) of the accumulated data. For example, a relatively high input/output bandwidth may be required for the working memory to perform reading and writing associated with the accumulated data. For example, relatively high performance of processor resources may be required.

Referring back to FIG. 1, the display device 100 may further include a bus system 150, a working memory 160, and a nonvolatile memory 170.

The bus system 150 interposed between the time controller 120 and the working memory 160 and the nonvolatile memory 170 is configured to provide an interface between the working memory 160 and the nonvolatile memory 170 to the timing controller 120 and the deterioration compensator 121. The deterioration compensator 121 may communicate with the working memory 160 and the nonvolatile memory 170 through the bus system 150.

According to an embodiment of the disclosure, the deterioration compensator 121 is configured to update an accumulated stress data set corresponding to a selected one of a plurality of display areas of the display panel 110 in the working memory 160 partially based on the reference image frame. The deterioration compensator 121 is configured to update an accumulated stress data set corresponding to a next display area of the display panel 110 in the working memory 160 partially based on a next reference image frame. As described above, in association with each reference image frame, only the accumulated stress data set corresponding to one selected display area may be updated.

The deterioration compensator 121 is configured to generate the corrected image frame MFR by performing compensation for the input image frame IFR based on the updated accumulated stress data sets.

In embodiments, the reference image frame may be at least one of the input image frame IFR, the corrected image frame MFR, and image frames generated through additional processing for the input image frame IFR and the corrected image frame MFR.

In embodiments, the working memory 160 may include at least one of memories such as a RAM, a dynamic RAM (DRAM), a static RAM (SRAM), a synchronous dynamic RAM (SDRAM), and a double data rate synchronous dynamic random access memory (DDR SDRAM), and the like.

In embodiments, the nonvolatile memory 170 may include at least one of storage media such as a flash memory that maintains data even though power is cut off.

In embodiments, the timing controller 120, the bus system 150, the working memory 160, and the nonvolatile memory 170 are included in a control device that may be provided in a form of a control board CB of FIG. 1. The timing controller 120 mounted on the control board CB may be connected to other configurations of the display device 100, such as the scan driver 130, the data driver 140, and the display panel 110 through input/output interfaces (for example, signal pads) of the control board CB. In embodiments, the control board CB may further include at least a portion of the data driver 140.

Figure 3:
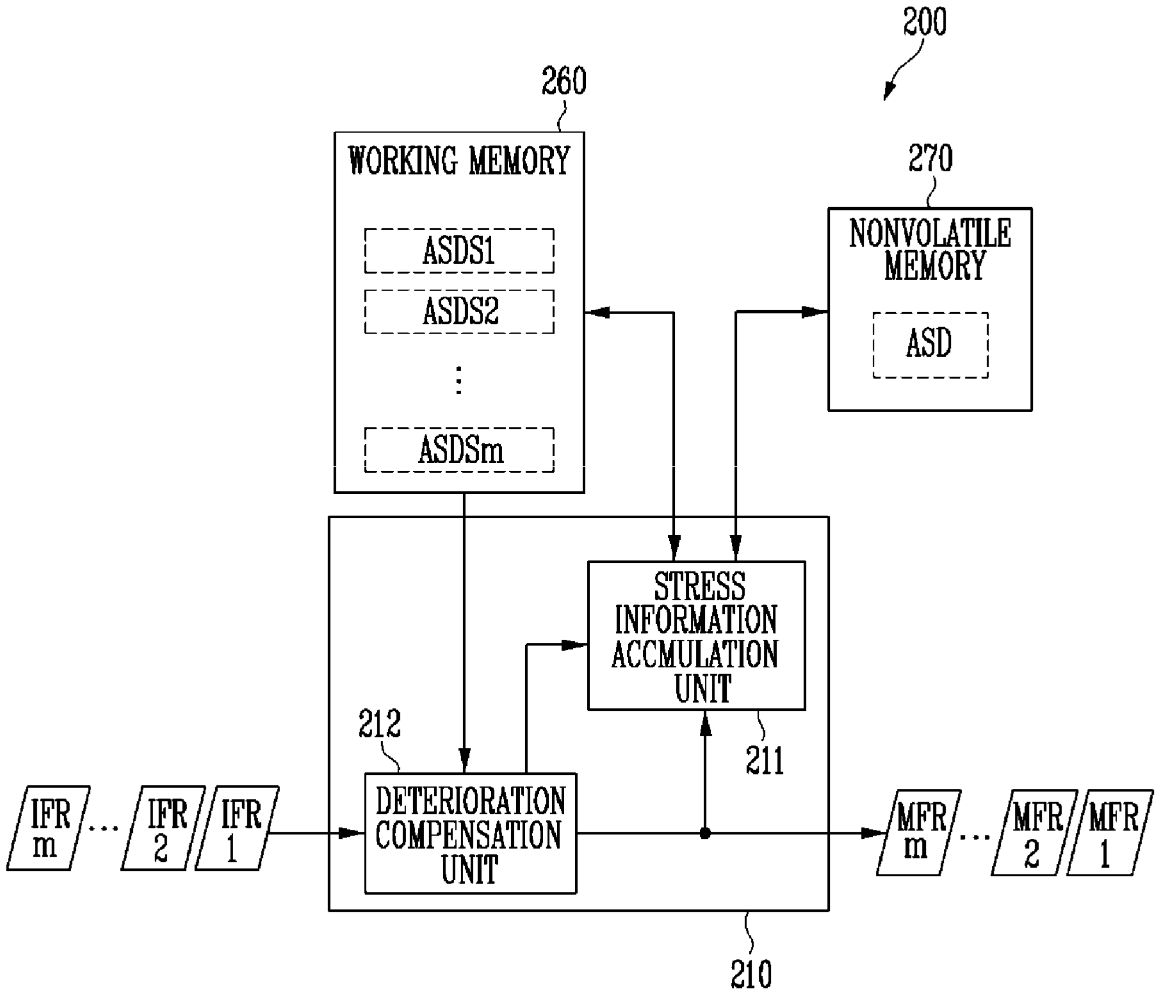
FIG. 3 is a block diagram illustrating an embodiment of a control board of FIG. 1.
Figure 4:
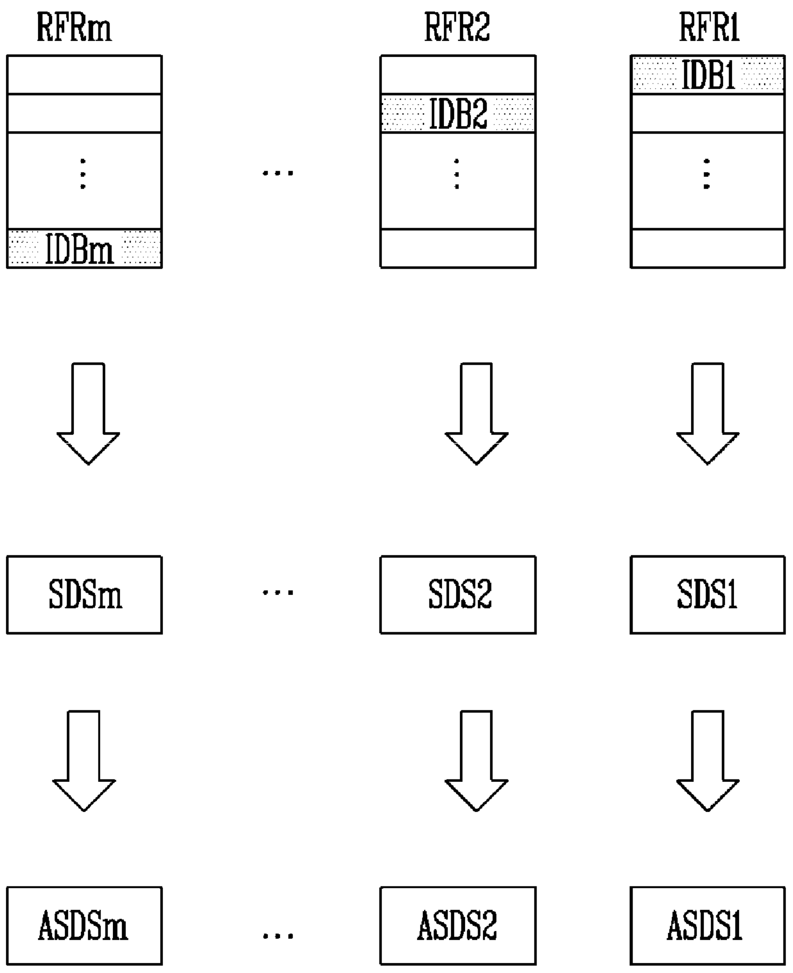
FIG. 4 is a diagram illustrating processes of updating first to m-th accumulated stress data sets based on first to m-th reference image frames.
Figure 5:
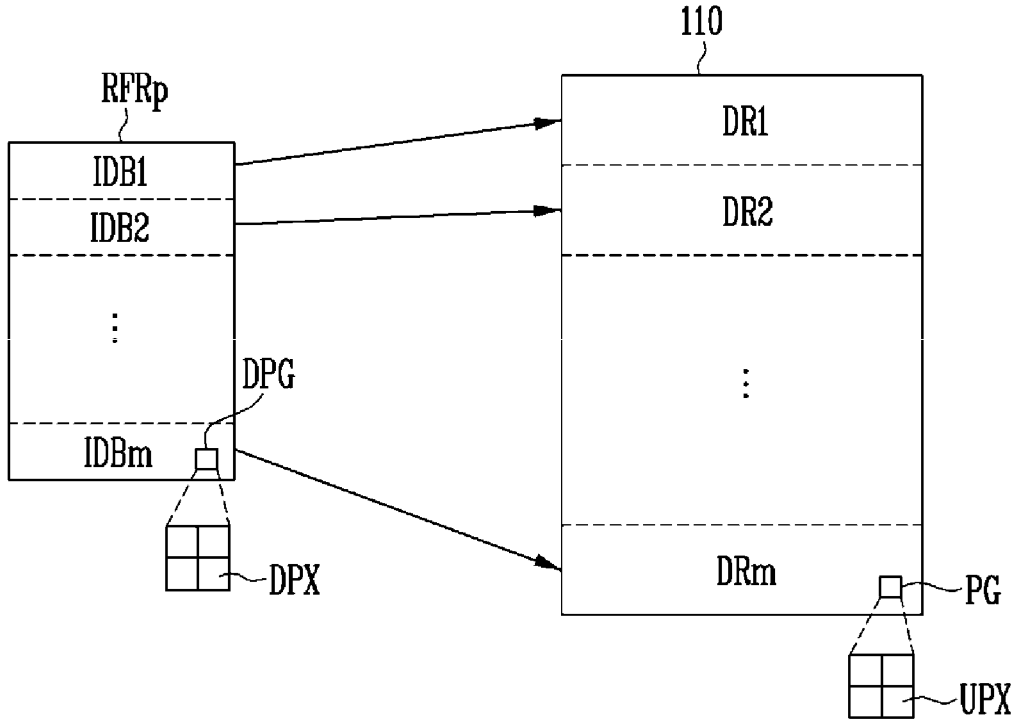
FIG. 5 is a diagram illustrating a relationship between display areas of the display panel of FIG. 1 and image data blocks of a reference image frame.

FIG. 3 is a block diagram illustrating an embodiment of the control board of FIG. 1. FIG. 4 is a diagram illustrating processes of updating first to m-th accumulated stress data sets based on first to m-th reference image frames. FIG. 5 is a diagram illustrating a relationship between display areas of the display panel of FIG. 1 and image data blocks of the reference image frame.

Referring to FIG. 3, the control board 200 may include a deterioration compensator 210, a working memory 260, and a nonvolatile memory 270. The deterioration compensator 210, the working memory 260, and the nonvolatile memory 270 may be provided as the deterioration compensator 121, the working memory 160, and the nonvolatile memory 170 of FIG. 1, respectively.

The deterioration compensator 210 may include a stress information accumulation unit 211 and a deterioration compensation unit 212. Components of the deterioration compensator 210 such as the stress information accumulation unit 211 and the deterioration compensation unit 212 may read and write data by accessing the working memory 260 and the nonvolatile memory 270.

The stress information accumulation unit 211 operates in response to control of the deterioration compensation unit 212. The stress information accumulation unit 211 is configured to update the first to m-th accumulated stress data sets ASDS1 to ASDSm in the working memory 260. The first to m-th accumulated stress data sets ASDS1 to ASDSm represent accumulated stresses of first to m-th display areas DR1 to DRm (refer to FIG. 5) of the display panel 110, respectively.

The deterioration compensation unit 212 is configured to generate first to m-th corrected image frames MFR1 to MFRm by compensating for (or correcting) first to m-th input image frames IFR1 to IFRm based on the first to m-th accumulated stress data sets ASDS1 to ASDSm, respectively. For example, the deterioration compensation unit 212 may generate a corrected image frame by adding compensation values to grayscale values of data pixels of the input image frame. Such compensation values may be determined based on the first to m-th accumulated stress data sets ASDS1 to ASDSm.

In embodiments, the control board 200 may further include a processor for performing various processes such as modifying a data format and/or arrangement of each of the first to m-th corrected image frames MFR1 to MFRm to be suitable for the display panel 110.

Referring to FIG. 4 together with FIG. 3, the stress information accumulation unit 211 may update the first to m-th accumulated stress data sets ASDS1 to ASDSm based on the first to m-th reference image frames RFR1 to RFRm, respectively. In embodiments, the first to m-th reference image frames RFR1 to RFRm may be the first to m-th corrected image frames MFR1 to MFRm, respectively. In other embodiments, the first to m-th reference image frames RFR1 to RFRm may be the first to m-th input image frames IFR1 to IFRm, respectively. In still other embodiments, the first to m-th reference image frames RFR1 to RFRm may be image frames generated through additional processes of the first to m-th corrected image frames MFR1 to MFRm.

When the display panel 110 is divided into and/or defined as m display areas, m reference image frames RFR1 to RFRm may form one frame group.

Referring to FIG. 5, the display panel 110 may be divided into and/or defined as the first to m-th display areas DR1 to DRm. Each of the first to m-th display areas DR1 to DRm may include a plurality of unit pixels UPX. The plurality of unit pixels UPX may include sub-pixels such as, for example, a red sub-pixel, a green sub-pixel, and a blue sub-pixel. The pixel PX of FIG. 1 may be provided as a sub-pixel. A plurality of unit pixels UPX may be grouped into pixel groups. For example, one pixel group PG may include four unit pixels UPX.

A p-th (p is an integer greater than or equal to 1 and less than or equal to m) reference image frame RFRp may be divided into first to m-th image data blocks IDB1 to IDBm to be displayed respectively by the first to m-th display areas DR1 to DRm, as shown by arrows of FIG. 5. Each of the first to m-th image data blocks IDB1 to IDBm may include a plurality of data pixels DPX. Each of the data pixels DPX may be displayed by the unit pixels UPX. The data pixels DPX may be grouped into data pixel groups. For example, when one pixel group PG includes four unit pixels UPX, one data pixel group DPG may include four data pixels DPX.

In the p-th reference image frame RFRp, only one (for example, IDBp) of the first to m-th image data blocks IDB1 to IDBm may be extracted, and a stress data set for a corresponding display area (for example, IDBp) may be generated from the extracted image data block. Remaining image data blocks of the p-th reference image frame RFRp are not used in generating the stress data sets and are dropped.

In FIG. 4, a first stress data set SDS1 may be generated from a first reference image frame RFR1, and a second stress data set SDS2 may be generated from a second reference image frame RFR2. As described above, an m-th stress data set SDSm may be generated from an m-th reference image frame RFRm.

Accordingly, the first to m-th stress data sets SDS1 to SDSm may correspond to different display areas DR1 to DRm, and the first to m-th accumulated stress data sets ASDS1 to ASDSm may also correspond to different display areas DR1 to DRm. For example, the first to m-th image data blocks IDB1 to IDBm may be extracted from the first to m-th reference image frames RFR1 to RFRm, respectively. In this case, the first to m-th stress data sets SDS1 to SDSm generated therefrom may indicate stresses applied to the first to m-th display areas DR1 to DRm, respectively.

The generated stress data set may include a stress value corresponding to each data pixel group DPG. The stress value may be determined according to an average value of grayscale values of the four data pixels DPX included in the corresponding data pixel group DPG. For example, the stress value may include an average value of red grayscale values of the four data pixels DPX, an average value of green grayscale values of the four data pixels DPX, and, an average value of blue grayscale values of the four data pixels DPX. Accordingly, each stress data set may include stress values of a plurality of data pixel groups.

Referring to FIGS. 3 and 4, the stress information accumulation unit 211 may update the first to m-th accumulated stress data sets ASDS1 to ASDSm of the working memory 260 according to the first to m-th stress data sets SDS1 to SDSm.

Each accumulated stress data set may include an accumulated stress value corresponding to each data pixel group DPG. In embodiments, the accumulated stress value may be updated to a value obtained by adding the stress value of the stress data set to the corresponding accumulated stress value. For example, each stress value may be expressed by a set of 8 data bits corresponding to red, 8 data bits corresponding to green, and 8 data bits corresponding to blue, and each accumulated stress value may be expressed by a set of 42 data bits corresponding to red, 42 data bits corresponding to green, and 42 data bits corresponding to blue.

The stress information accumulation unit 211 may store (or back up) the first to m-th accumulated stress data sets ASDS1 to ASDSm of the working memory 260 in the nonvolatile memory 270. In FIG. 3, it is illustrated that the first to m-th accumulated stress data sets ASDS1 to ASDSm are stored in the nonvolatile memory 270 as accumulated stress data ASD. In embodiments, the first to m-th accumulated stress data sets ASDS1 to ASDSm may be stored in the nonvolatile memory 270 from the working memory 260 periodically and/or when power is turned off. In embodiments, the first to m-th accumulated stress data sets ASDS1 to ASDSm may be loaded from the nonvolatile memory 270 to the working memory 260 when power is turned on.

In embodiments, the stress information accumulation unit 211 and the deterioration compensation unit 212 may be integrated or separated into more components. In embodiments, each of the stress information accumulation unit 211 and the deterioration compensation unit 212 may be implemented as hardware, software, firmware, or a combination thereof.

When the accumulated stress data for the entire display panel 110 (DR1 to DRm, refer to FIG. 5) is updated according to all image data blocks IDB1 to IDBm (refer to FIG. 5) of each reference image frame, the updated accumulated stress data has a relatively large size. When the number of data pixels included in the data pixel group DPG of FIG. 5 is reduced, the number of data pixel groups increases and resolution of the accumulated stress values increases, and thus the updated accumulated stress data has a larger size. In this case, a relatively high input/output bandwidth may be required for the working memory 260 in order to update (for example, read and write data) the accumulated stress data in association with each reference image frame.

According to an embodiment of the disclosure, the stress information accumulation unit 211 selects only one image data block from each reference image frame and updates the accumulated stress data set for one display area according to the selected image data block. The stress information accumulation unit 211 may extract different image data blocks from the respective first to m-th reference image frames RFR1 to RFRm, to update the first to m-th accumulated stress data sets ASDS1 to ASDSm respectively corresponding to different display areas DR1 to DRm. Accordingly, in association with each reference image frame, only the accumulated stress data set having a relatively small size may be updated in the working memory 260. This means that the input/output bandwidth required for the working memory 260 is reduced. Accordingly, relatively few resources may be consumed for processes associated with the accumulated stress data sets ASDS1 to ASDSm.

A compensation value applied to the input image frame may be determined according to the accumulated stress data generated based on the reference image frames received for a relatively long time. Accordingly, even though only the accumulated stress data set for one display area is updated for each reference image frame, as in the embodiments of the disclosure, when such a process is repeated for a relatively long time, the compensation value applied to the input image frame may have substantially the same reliability.

Figure 6:
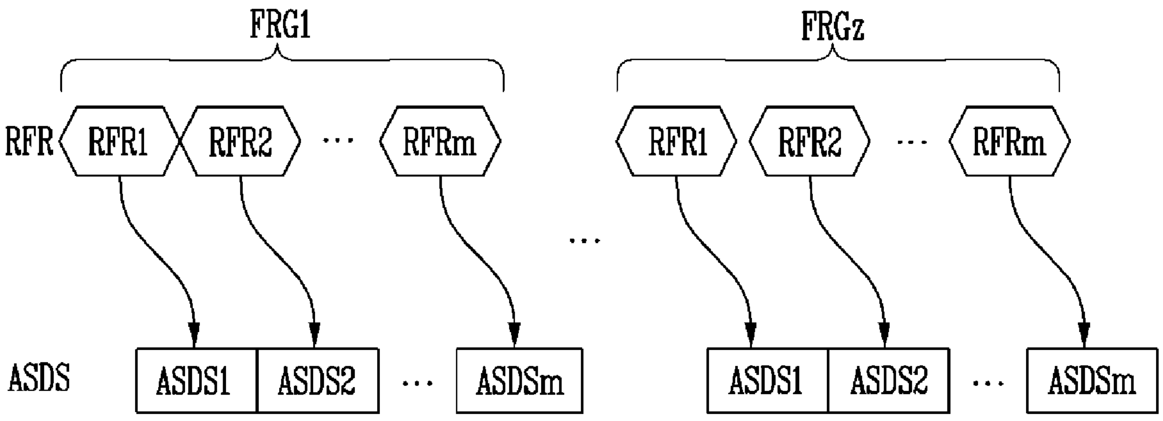
FIG. 6 is a diagram illustrating processes of updating the first to m-th accumulated stress data sets based on first to z-th frame groups.

FIG. 6 is a diagram illustrating processes of updating the first to m-th accumulated stress data sets based on first to z-th frame groups.

Referring to FIG. 6, each of the first to z-th frame groups FRG1 to FRGz may include the first to m-th reference image frames RFR1 to RFRm described with reference to FIG. 4.

In embodiments, the stress information accumulation unit 211 may update the first to m-th accumulated stress data sets ASDS1 to ASDSm based on the corresponding first to m-th reference image frames RFR1 to RFRm whenever each of the first to z-th frame groups FRG1 to FRGz is received. In other embodiments, the stress information accumulation unit 211 may update the first to m-th accumulated stress data sets ASDS1 to ASDSm based on the corresponding first to m-th reference image frames RFR1 to RFRm when a portion of the first to z-th frame groups FRG1 to FRGz, for example, each of the first frame group FRG1 and the z-th frame group FRGz is received.

Figure 7A:
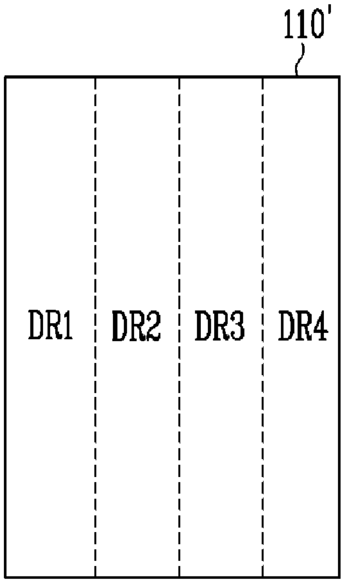
FIGS. 7A and 7B are block diagrams illustrating embodiments of display areas that may be divided in various methods.
Figure 7B:
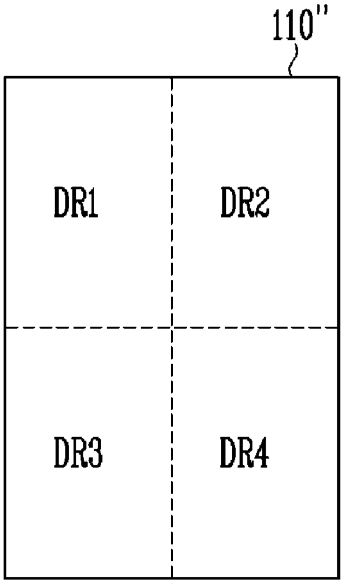

FIGS. 7A and 7B are block diagrams illustrating embodiments of display areas that may be divided in various methods.

The display panel 110 of FIG. 1 may be divided (or defined) into a plurality of display areas in various shapes. In this case, the reference image frame may be divided into image data blocks to correspond to the divided display areas, and the divided image data blocks are displayed by the display areas, respective.

In FIG. 7A, a display panel 110' is shown as including a plurality of display areas DR1 to DR4 arranged in a row direction. In FIG. 7B, a display panel 110" is shown as including a plurality of display areas DR1 to DR4 arranged in row and column directions, for example, in a lattice form. In other embodiments, the display panel 110 may include a plurality of display areas DR1 to DRm arranged in a column direction as shown in FIG. 5.

Figure 8:
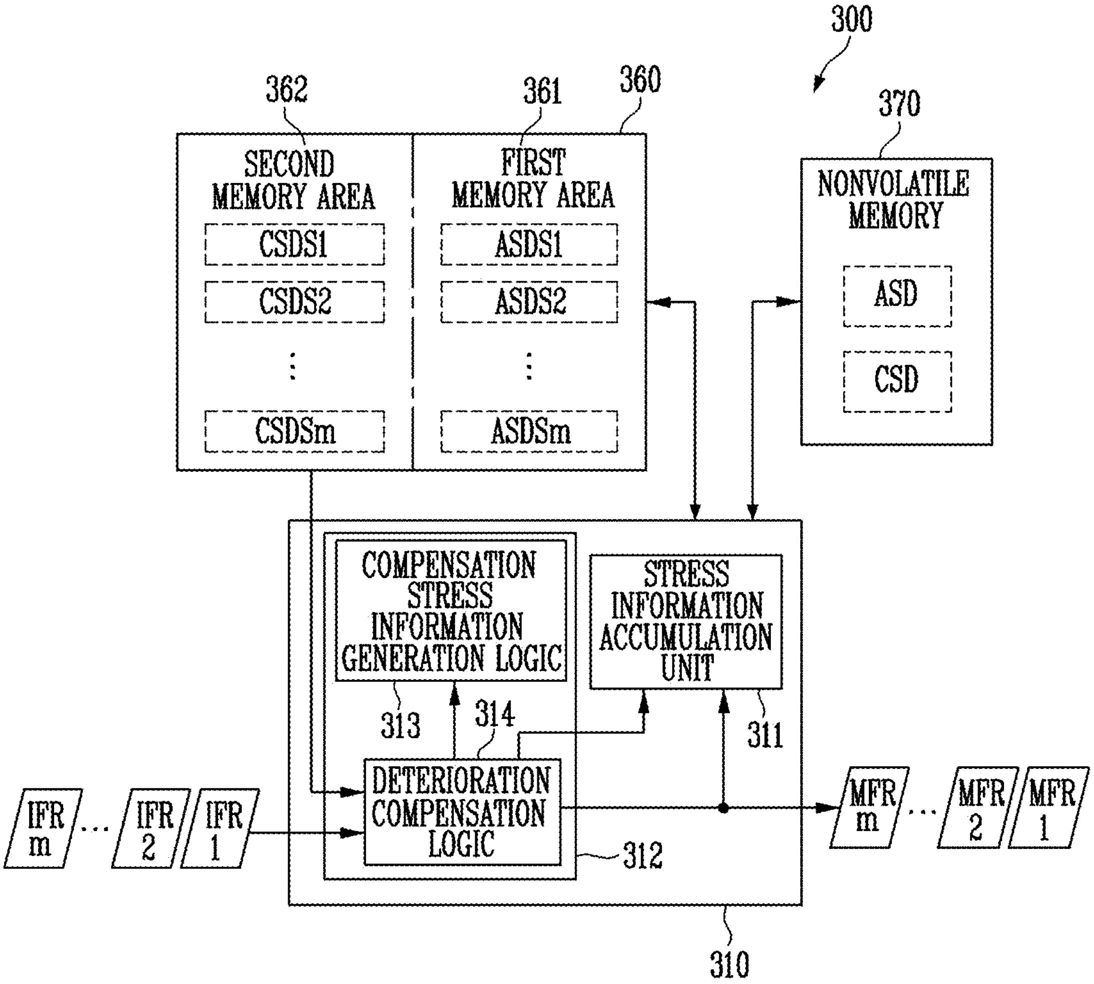
FIG. 8 is a block diagram illustrating another embodiment of the control board of FIG. 1.
Figure 9:
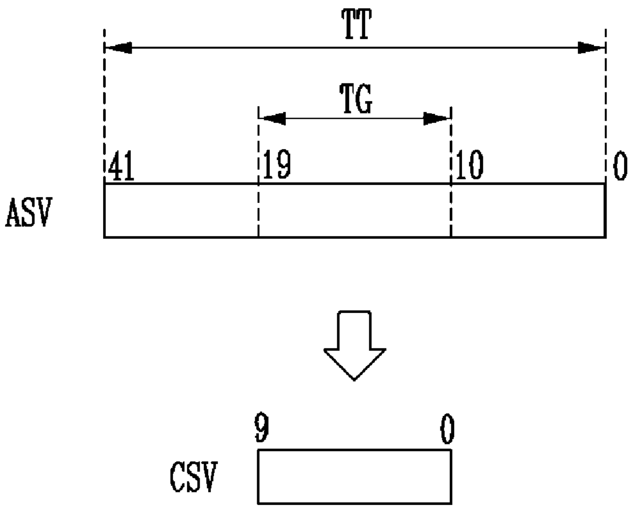
FIG. 9 is a diagram illustrating an accumulated stress value and a compensation stress value.

FIG. 8 is a block diagram illustrating another embodiment of the control board of FIG. 1. FIG. 9 is a diagram illustrating an accumulated stress value and a compensation stress value.

Referring to FIG. 8, the control board 300 may include a deterioration compensator 310, a working memory 360, and a nonvolatile memory 370.

The deterioration compensator 310 may include a stress information accumulation unit 311 and a deterioration compensation unit 312. The stress information accumulation unit 311 is described similarly to the stress information accumulation unit 211 described with reference to FIG. 3. The deterioration compensation unit 312 may include a compensation stress information generation logic 313 and a deterioration compensation logic 314. The stress information accumulation unit 311 operates in response to control of the deterioration compensation logic 314 of the deterioration compensation unit 312. Hereinafter, an overlapping description is omitted.

The deterioration compensation unit 312 is configured to generate the first to m-th corrected image frames MFR1 to MFRm by correcting each of the first to m-th input image frames IFR1 to IFRm based on the first to m-th accumulated stress data sets ASDS1 to ASDSm.

The compensation stress information generation logic 313 operates in response to control of the deterioration compensation logic 314. The compensation stress information generation logic 313 may access the working memory 360. The compensation stress information generation logic 313 may update first to m-th compensation stress data sets CSDS1 to CSDSm based on the first to m-th accumulated stress data sets ASDS1 to ASDSm, respectively, for example, periodically. Accumulated stress values of each accumulated stress data set may be converted into compensation stress values of the corresponding compensation stress data set. Referring to FIG. 9, each accumulated stress value ASV of the accumulated stress data set may be implemented (or expressed) with a predetermined number of data bits TT. For example, the accumulated stress value ASV may be expressed with a total of 42 data bits of [41:0].

Predetermined data bits between most significant data bits and least significant data bits among the entire data bits TT of the accumulated stress value ASV may be defined as target data bits TG. In addition, the compensation stress value CSV may be determined according to the target data bits TG. For example, 10 data bits of [19:10] among the entire data bits TT of the accumulated stress value ASV may be extracted to determine the compensation stress value CSV expressed with 10 data bits. At least one of various methods and/or algorithms may be employed to determine the compensation stress value CSV, and the present embodiments are not limited to such methods and/or algorithms.

The stress information accumulation unit 311 may store (or back up) not only the first to m-th accumulated stress data sets ASDS1 to ASDSm, but also the first to m-th compensation stress data sets CSDS1 to CSDSm in the nonvolatile memory 370 from the working memory 360. In FIG. 8, it is shown that the first to m-th compensation stress data sets CSDS1 to CSDSm are stored in the nonvolatile memory 370 as the compensation stress data CSD. In embodiments, the first to m-th compensation stress data sets CSDS1 to CSDSm may be stored in the nonvolatile memory 370 from the working memory 360 periodically and/or when power is turned off. In embodiments, the first to m-th compensation stress data sets CSDS1 to CSDSm may be loaded from the nonvolatile memory 370 to the working memory 360 when power is turned on.

Operations in which the compensation stress information generation logic 313 accesses the working memory 360 and updates the first to m-th compensation stress data sets CSDS1 to CSDSm may not overlap operations in which the stress information accumulation unit 311 accesses the working memory 360 and updates the first to m-th accumulated stress data sets ASDS1 to ASDSm in time. This prevents an input/output bandwidth required for the working memory 360 from being increased. Such control may be performed by deterioration compensation logic 314. To this end, the first to m-th compensation stress data sets CSDS1 to CSDSm may be managed in a memory area separate from the first to m-th accumulated stress data sets ASDS1 to ASDSm. In embodiments, the first to m-th accumulated stress data sets ASDS1 to ASDSm may be stored in a first memory area 361, and the first to m-th compensation stress data sets CSDS1 to CSDSm may be stored in a second memory area 362 that is physically or logically separated from the first memory area 361.

The deterioration compensation logic 314 is configured to generate the first to m-th corrected image frames MFR1 to MFRm by correcting each of the first to m-th input image frames IFR1 to IFRm using the first to m-th compensation stress data sets CSDS1 to CSDSm.

In embodiments, at least a portion of the stress information accumulation unit 311, the stress compensation information generation logic 313, and the deterioration compensation logic 314 may be integrated or separated into more components. In embodiments, each of the stress information accumulation unit 311, the stress compensation information generation logic 313, and the deterioration compensation logic 314 may be implemented as hardware, software, firmware, or a combination thereof.

Figure 10:
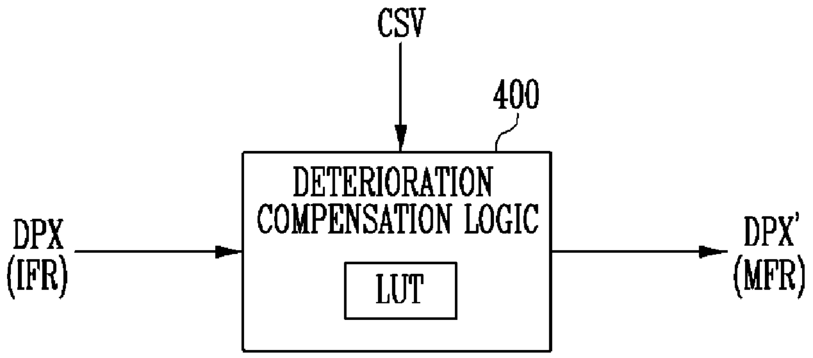
FIG. 10 is a block diagram illustrating an embodiment of a deterioration compensation logic of FIG. 8.

FIG. 10 is a block diagram illustrating an embodiment of the deterioration compensation logic of FIG. 8.

Referring to FIG. 10, the deterioration compensation logic 400 may perform compensation for the data pixel DPX included in the input image frame IFR to output a data pixel DPX' of the corrected image frame MFR. The input image frame IFR may be any one of the first to m-th input image frames IFR1 to IFRm of FIG. 8. The corrected image frame MFR may be any one of the first to m-th corrected image frames MFR1 to MFRm of FIG. 8.

The deterioration compensation logic 400 may include at least one look-up table LUT. The deterioration compensation logic 400 receives, from the working memory 360, a compensation stress value CSV corresponding to the corresponding data pixel DPX or the data pixel group DPG (refer to FIG. 5) to which the corresponding data pixel DPX belongs. The deterioration compensation logic 400 may obtain a compensation value corresponding to the compensation stress value CSV from at least one look-up table LUT, and reflect the obtained compensation value to the grayscale value of the data pixel DPX, to determine the data pixel DPX' of the corrected image frame MFR. For example, the compensation value may be added to the grayscale value of the data pixel DPX.

As described above, the deterioration compensation logic 400 may generate the corrected image frame MFR from the input image frame IFR using the first to m-th compensation stress data sets CSDS1 to CSDSm of FIG. 8.

Figure 11:
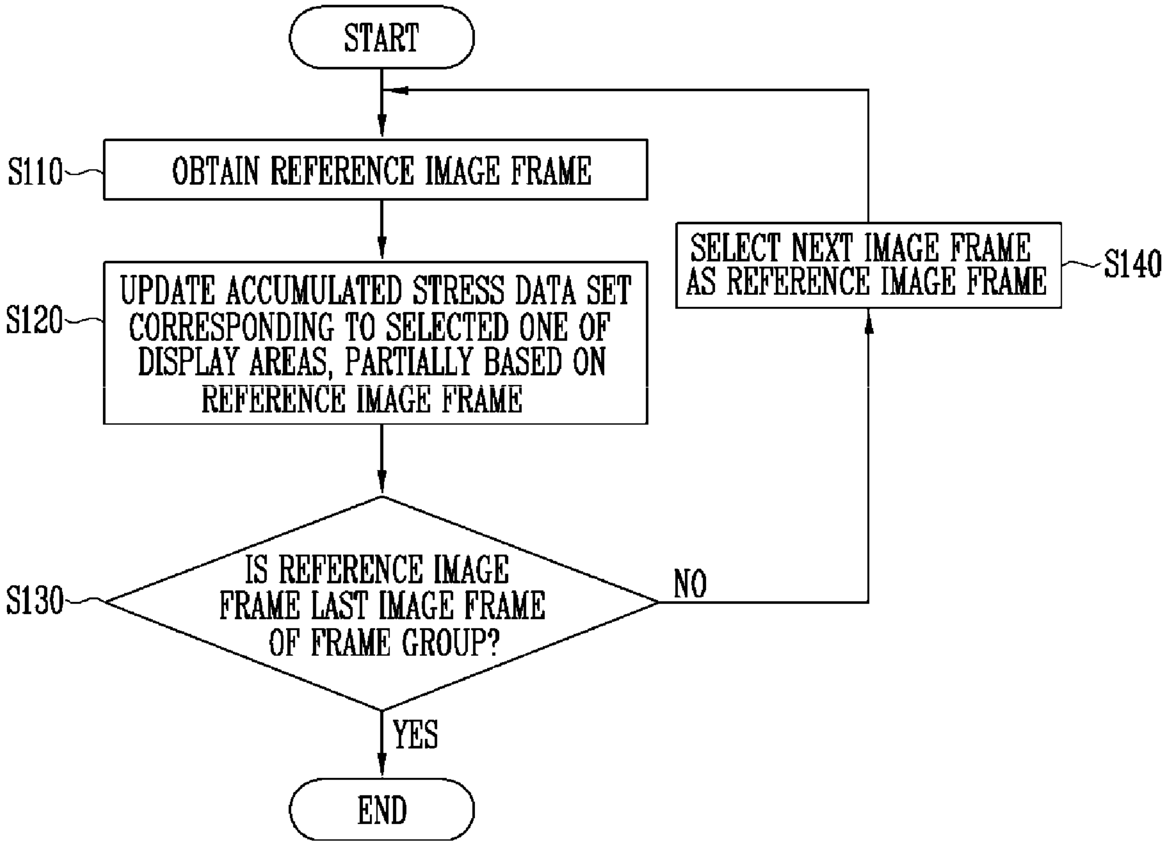
FIG. 11 is a flowchart illustrating a method of updating accumulated stress data sets for display areas of a display panel according to an embodiment of the disclosure.

FIG. 11 is a flowchart illustrating a method of updating accumulated stress data sets for display areas of a display panel according to an embodiment of the disclosure. Operations of FIG. 11 may be performed by the control board CB of FIG. 1.

Referring to FIGS. 1, 3, and 11, in step S110, a reference image frame of an arbitrary frame group is obtained. For example, the control board CB may obtain one of the first to m-th input image frames IFR1 to IFRm from the outside as the reference image frame. As another example, the control board CB may obtain one of the first to m-th corrected image frames MFR1 to MFRm as the reference image frame. In the following description with reference to FIGS. 11 to 13, it is assumed that a p-th (p is an integer greater than or equal to 1 and less than or equal to m) corrected image frame MFRp among the first to m-th corrected image frames MFR1 to MFRm is obtained as the reference image frame.

In step S120, an accumulated stress data set corresponding to one display area of the display panel 110 is updated partially based on the reference image frame. That is, a portion of the reference image frame may be extracted, and a q-th (q is an integer greater than or equal to 1 and less than or equal to m) accumulated stress data set ASDSq may be updated based on the extracted portion. For example, q may be equal to p. The q-th accumulated stress data set ASDSq may correspond to a q-th display area DRq among the first to m-th display areas DR1 to DRm (refer to FIG. 5) of the display panel 110.

In step S130, it is determined whether the reference image frame is a last image frame of a corresponding frame group. When the reference image frame is the last image frame of the corresponding frame group, then the operation ends. On the contrary, when the reference image frame is not the last image frame of the corresponding frame group, step S140 is performed such that a next corrected image frame of the corresponding frame group is selected as the reference image frame. For example, when p is less than m, step S140 is performed, p is changed to p+1, and step S110 is performed again. When p is equal to m, the update of the accumulated stress data sets using the corresponding frame group is ended.

Thereafter, an input image frame is corrected based on the updated accumulated stress data sets, and an image is displayed on the display panel 110 according to the corrected image frame.

As described above, according to an embodiment of the disclosure, only one image data block is selected from the reference image frame, and the accumulated stress data set for one display area is updated according to the selected image data block. By extracting different image data blocks from each of the reference image frames of the corresponding frame group, the first to m-th accumulated stress data sets ASDS1 to ASDSm respectively corresponding to the different display areas DR1 to DRm may be updated. Accordingly, in association with each reference image frame, only an accumulated stress data set having a relatively small size may be updated in the working memory 260. Accordingly, an input/output bandwidth required for the working memory 260 may be reduced. Therefore, relatively few resources may be consumed in processes related to the accumulated stress data sets ASDS1 to ASDSm.

Figure 12:
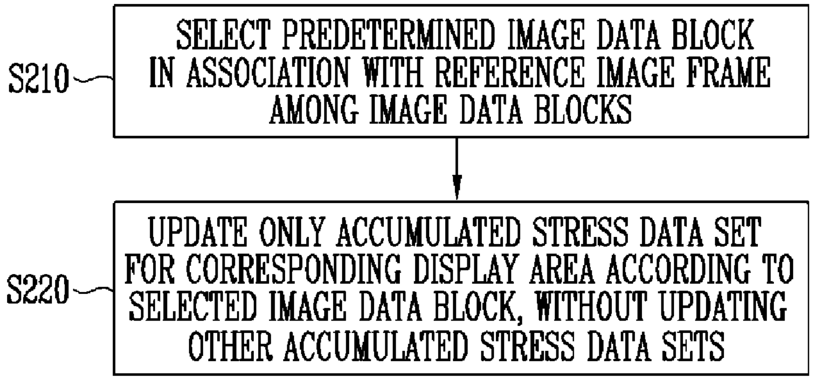
FIG. 12 is a flowchart illustrating an embodiment of step S120 of FIG. 11.

FIG. 12 is a flowchart illustrating an embodiment of step S120 of FIG. 11.

Referring to FIGS. 1, 3, and 12, in step S210, a predetermined image data block is selected in associated with the reference image frame from among the image data blocks IDB1 to IDBm.

For example, the first to m-th corrected image frames MFR1 to MFRm may correspond to the first to m-th display areas DR1 to DRm, respectively. In this case, when the p-th corrected image frame MFRp is the reference image frame, a p-th image data block IDBp corresponding to a p-th display area DRp may be selected. The number of reference image frames forming one frame group may be the same as the number of the first to m-th display areas DR1 to DRm.

In step S220, the accumulated stress data set for the corresponding display area is updated with reference to the selected image data block of the reference image frame, without updating the accumulated stress data sets for other display areas.

For example, a p-th accumulated stress data set ASDSp may be updated based on the p-th image data block IDBp. A stress data set (refer to SDS1 to SDSm of FIG. 4) having stress values respectively corresponding to the data pixel groups DPG of the p-th image data block IDBp may be generated, and the corresponding stress values may be updated in the accumulated stress data sets ASDS1 to ASDSm of FIG. 4.

Figure 13:
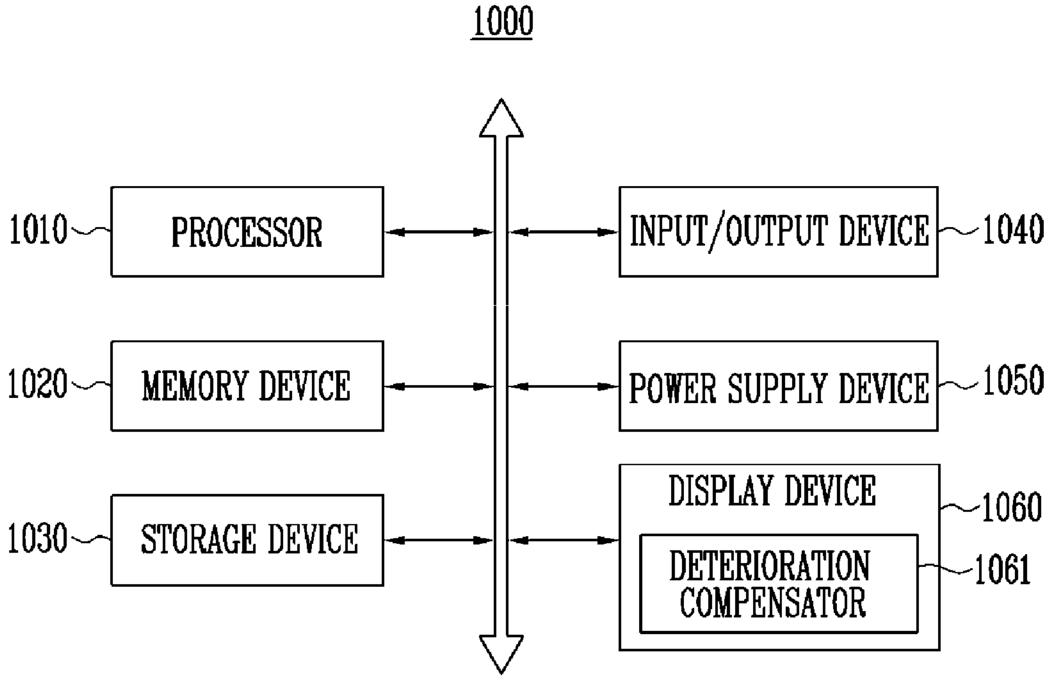
FIG. 13 is a block diagram illustrating a display system according to an embodiment of the disclosure.

FIG. 13 is a block diagram illustrating a display system according to an embodiment of the disclosure.

Referring to FIG. 13, the display system 1000 may include a processor 1010, a memory device 1020, a storage device 1030, an input/output device 1040, a power supply device 1050, and a display device 1060. The display system 1000 may further include ports for communicating with other devices such as a video card, a sound card, a memory card, and a USB device.

The processor 1010 may perform various tasks and calculations. In embodiments, the processor 1010 may include an application processor, a graphic processing unit, a microprocessor, a central processing unit (CPU), and the like. The processor 1010 may be connected to other components of the display system 1000 through a bus system. In embodiments, the bus system may include a peripheral component interconnect (PCI) bus. The processor 1010 may display an image on the display device 1060 by transmitting the input image frame IFR and the control signals CTRL of FIG. 1 to the display device 1060.

The memory device 1020 may be provided as a working memory and/or a buffer memory of the display system 1000 and/or the processor 1010. In embodiments, the memory device 1020 may include volatile memory devices such as a dynamic random access memory (DRAM), a static random access memory (SRAM), and a mobile DRAM.

The storage device 1030 may write data and read data in response to control of the processor 1010. The storage device 1030 may include a nonvolatile storage medium that maintains data when power of the display system 1000 is cut off. In embodiments, the storage device 1030 may include a solid state drive (SSD), a hard disk drive (HDD), and the like.

In embodiments, at least a portion of the memory device 1020 may be provided as the working memory 160 of FIG. 1. At least a portion of the storage device 1030 may be provided as the nonvolatile memory 170 of FIG. 1. In this case, corresponding portions of the memory device 1020 and the storage device 1030 may be mounted on the control board CB of FIG. 1.

The input/output device 1040 may include user input devices such as a keyboard, a keypad, a touch pad, a touch screen, and a mouse, and output devices such as a speaker and a printer. The power supply device 1050 may supply power necessary for an operation of the display system 1000.

The display device 1060 may display an image in response to the control of the processor 1010. The display device 100 of FIG. 1 may be provided as the display device 1060. The display device 1060 may include a deterioration compensator 1061, and the deterioration compensator 1061 may operate similarly to the deterioration compensator 121, the timing controller 120, and/or the control board CB of FIG. 1.

In embodiments, the display system 1000 may be a computer device or an electronic device including a display device, such as a digital TV (digital television), a 3D TV, a personal computer (PC), a household electronic device, a notebook computer (laptop computer), a tablet computer, a mobile phone, a smart phone, a personal digital assistant (PDA), a portable multimedia player (PMP), a digital camera, a music player, a portable game console, or a navigation device.

Although the disclosure has been described with reference to the preferred embodiment above, those skilled in the art or those having a common knowledge in the art will understand that the disclosure may be variously modified and changed without departing from the spirit and technical area of the disclosure described in the claims which will be described later.

Therefore, the technical scope of the disclosure should not be limited to the contents described in the detailed description of the specification, but should be defined by the claims.

What is claimed is:

1. A control device connected to a display panel, the control device comprising:

a timing controller connected to a scan driver, a data driver and the display panel to display images by driving the display panel according to data corresponding to image frames; and a memory connected to the timing controller, wherein the timing controller selects at least one of the image frames, corresponding to a whole area of the display panel, as a reference image frame and updates a stress data corresponding to a partial area of the display panel, without updating a stress data corresponding to a remaining area of the display panel, in the memory based on one image data block selected from image data blocks of the reference image frame, and wherein the stress data is determined based on an average value of grayscale values of a data pixel group included in the one image data block.

2. The control device according to claim 1, wherein the display panel includes display areas for respectively displaying the image data blocks of the reference image frame, and the partial area of the display panel is any one of the display areas.

3. The control device according to claim 2, wherein, when a first image frame among the image frames is selected as the reference image frame, the updated stress data corresponds to a first display area of the display areas, and when a second image frame among the image frames is selected as the reference image frame, the updated stress data corresponds to a second display area different from the first display area of the display areas.

4. The control device according to claim 2, wherein the timing controller is configured to update stress data corresponding to different display areas whenever each of the image frames is selected as the reference image frame.

5. The control device according to claim 1, wherein the timing controller is configured to correct at least a portion of an additional image frame based on the stress data and to display a corrected image frame on the display panel, when the additional image frame is received.

6. A display device comprising:

a display panel;

a timing controller connected to a scan driver, a data driver and the display panel to display images by driving the display panel according to data corresponding to a plurality of image frames; and a memory connected to the timing controller, wherein the plurality of image frames is divided into frame groups, wherein the timing controller selects any one of the frame groups among a first frame group and a second frame group which is discontinuous from the first frame group, selects at least one of the image frames, corresponding to a whole area of the display panel, included in the selected frame group which is either the first frame group or the second frame group as a reference image frame, and updates a stress data set corresponding to a partial area of the display panel, without updating a stress data corresponding to a remaining area of the display panel, in the memory based on one image data block selected from image data blocks of the reference image frame, and wherein the stress data set is determined based on an average value of grayscale values of a data pixel group included in the one image data block.

7. The display device according to claim 6, wherein the display panel includes display areas for respectively displaying the image data blocks of the reference image frame, and the partial area of the display panel is any one of the display areas.

8. The display device according to claim 7, wherein the display areas include first to m-th display areas (m is a natural number), and the timing controller is configured to update first to m-th stress data sets respectively corresponding to the first to m-th display areas in the memory based on the image frames included in the selected frame group.

9. The display device according to claim 8, wherein the image frames included in the selected frame group include first to m-th image frames, and the respective first to m-th stress data sets are updated based on different image frames of the first to m-th image frames.

10. The display device according to claim 8, wherein the timing controller is configured to determine first to m-th compensation data blocks corresponding to the first to m-th display areas based on the first to m-th stress data sets.

11. The display device according to claim 10, wherein the timing controller is configured to correct an additional image frame according to the first to m-th compensation data blocks and display a corrected image frame on the display panel, when the additional image frame is received.

12. The display device according to claim 6, wherein the memory is disposed separately from timing controller on one control board, and wherein the updating of the stress data set is performed via a bus system disposed between the timing controller and the memory.

13. A display device comprising:

a display panel;

a timing controller connected to a scan driver, a data driver and the display panel to display images by driving the display panel according to data corresponding to a plurality of image frames; and a memory connected to the timing controller, wherein the plurality of image frames is divided into frame groups, wherein the timing controller selects any one of the frame groups, selects at least one of the image frames included in the selected frame group as a reference image frame, and updates a stress data set corresponding to one of display areas of the display panel in the memory based on one of image data blocks of the reference image frame, wherein the display areas include first to m-th display areas (m is a natural number), and each of the frame groups includes first to m-th image frames, and wherein the timing controller is configured to update first to m-th stress data sets respectively corresponding to the first to m-th display areas in the memory based on the first to m-th image frames of a first frame group among the frame groups and to further update the first to m-th stress data sets of the memory based on the first to m-th image frames of a second frame group of the frame groups.

14. A display device comprising:

a display panel;

a timing controller connected to a scan driver, a data driver and the display panel to display images by driving the display panel according to data corresponding to image frames; and a memory connected to the timing controller and including a first memory area and a second memory area separated from each other, wherein the timing controller selects at least one of the image frames as a reference image frame, and updates a stress data set corresponding to one of display areas of the display panel in the memory based on one of image data blocks of the reference image frame, wherein the display areas include first to m-th display areas (m is a natural number), wherein the timing controller is configured to update first to m-th stress data sets corresponding to the first to m-th display areas in the memory based on the image frames and to determine first to m-th compensation data blocks corresponding to the first to m-th display areas based on the first to m-th stress data sets, wherein the first to m-th stress data sets are stored in the first memory area, and wherein the first to m-th compensation data blocks are stored in the second memory area.

15. A method of operating a control device for driving a display panel, the method comprising steps of:

receiving a plurality of image frames divided into frame groups;

selecting at least one of the image frames, corresponding to a whole area of the display panel, included in one frame group selected from the frame groups as a reference image frame; and updating a stress data set corresponding to a partial area of the display panel, without updating a stress data set corresponding to a remaining area of the display panel, in a memory based on one image data block selected from image data blocks of the reference image frame, wherein the stress data set is determined based on an average value of grayscale values of a data pixel group included in the one image data block.

16. The method according to claim 15, wherein the display panel includes display areas for respectively displaying the image data blocks of the reference image frame, and the stress data set corresponding to a different display area among the display areas is updated whenever each of the image frames is selected as the reference image frame.

17. An electronic apparatus comprising:

a display panel;

a timing controller connected to a scan driver, a data driver and the display panel to display images by driving the display panel according to data corresponding to image frames;

a processor providing the image frames and control signals to the timing controller; and a memory connected to the timing controller, wherein the timing controller selects at least one of the image frames, corresponding to a whole area of the display panel, as a reference image frame and updates a stress data corresponding to a partial area of the display panel, without updating a stress data corresponding to a remaining area of the display panel, in the memory based on one image data block selected from image data blocks of the reference image frame, and wherein the stress data is determined based on an average value of grayscale values of a data pixel group included in the one image data block.

* * * * *